United States Patent [19]

Carter, Jr. et al.

[11] Patent Number: 4,522,564
[45] Date of Patent: Jun. 11, 1985

[54] WIND-DRIVEN GENERATOR APPARATUS

[75] Inventors: J. Warne Carter, Jr., Burkburnett; J. Warne Carter, Sr., Wichita Falls, both of Tex.

[73] Assignee: Carter Wind Power, Wichita Falls, Tex.

[21] Appl. No.: 501,370

[22] Filed: Jun. 6, 1983

Related U.S. Application Data

[60] Division of Ser. No. 173,700, Jul. 30, 1980, Pat. No. 4,431,375, which is a continuation-in-part of Ser. No. 37,774, May 10, 1979, Pat. No. 4,366,387.

[51] Int. Cl.$^3$ .............................................. F03D 7/04
[52] U.S. Cl. ..................................... 416/140; 416/11; 416/132 B
[58] Field of Search ............ 416/9, 11, 170 A, 140 R, 416/169 B, 132 B, 135 A, 41 A

[56] References Cited

U.S. PATENT DOCUMENTS

| 36,217 | 8/1862 | Hunt | 416/169 B |
|---|---|---|---|
| 381,313 | 4/1888 | Winchell | 416/170 A |
| 580,302 | 4/1897 | Bagley | 416/169 B |
| 879,161 | 2/1908 | George | 416/170 A |
| 1,087,756 | 2/1914 | Garton | 416/169 B |
| 2,094,941 | 10/1937 | Burkhartsmeier | 416/132 B |
| 4,311,435 | 1/1982 | Bergero | 416/170 A |
| 4,378,198 | 3/1983 | Pettersson | 416/132 B |
| 4,431,375 | 2/1984 | Carter et al. | 416/132 B |

FOREIGN PATENT DOCUMENTS

| 177164 | 10/1906 | Fed. Rep. of Germany ... 416/169 B |
|---|---|---|
| 2655026 | 5/1978 | Fed. Rep. of Germany ... 416/132 B |
| 2715584 | 10/1978 | Fed. Rep. of Germany ... 416/132 B |
| 2834786 | 2/1980 | Fed. Rep. of Germany ... 416/132 B |
| 2413566 | 8/1979 | France ............................ 416/132 B |
| 7707210 | 11/1978 | Sweden ........................... 416/132 B |

Primary Examiner—Everette A. Powell, Jr.
Attorney, Agent, or Firm—Shapiro and Shapiro

[57] ABSTRACT

Disclosed is a wind-driven generator apparatus with variable pitch blades. The apparatus includes a yaw damping arrangement for resisting weathervaning rotation of a head assembly of the apparatus about a vertical axis and the apparatus further includes a pitch control mechanism for the blades which maintains the pitch substantially constant during normal operating r.p.m. of the blades but allows the blades to pitch up in an overspeed condition, and a brake mechanism for the generator shaft which includes an adjusting mechanism that compensates for wear in the brake.

1 Claim, 15 Drawing Figures

WIND-DRIVEN GENERATOR APPARATUS

This application is a division of application Ser. No. 173,700, filed July 30, 1980, now U.S. Pat. No. 4,431,375, which is a continuation-in-part of application Ser. No. 037,774, filed May 10, 1979, now U.S. Pat. No. 4,366,387.

BACKGROUND OF THE INVENTION

In general, the invention is concerned with improvements in the generation of electricity using wind power and more particularly with apparatus for achieving such generation.

Shortages and increased costs of fossil fuels have stimulated renewed interest in the use of wind power to generate electricity. Electrical generators mechanically coupled to wind-driven rotors have been the subject of intense research and development but problems of cost, reliability, efficiency, and safety have limited the adoption of such wind generator apparatus.

In an effort to accommodate a wide range of wind velocities, to provide self-starting blades, and to solve overload and overspeed problems, complex and expensive pitch changing mechanisms have been proposed. Fixed-pitch blades, while generally less expensive than variable-pitch blades, have not had the desired efficiency and safety and in some instances have not been self-starting. Manual or motor-driven yawing devices have often been required in order to orient rotors relative to the wind. Expensive cantilever tower support arrangements have been employed that are difficult to erect and that create difficulties in servicing the rotor and head assembly.

In order to obtain maximum benefit from a wind-driven generator, it is desirable that the generator be capable not only of supplying local needs when the wind velocity is sufficient but also of feeding excess power to the AC utility lines. When connected to the AC lines, the generator must generate electricity that is compatible with the AC on the lines and must not constitute a hazard to power company personnel.

In general, the prior art has failed to fill the need for a practical wind-driven generator.

The above noted application, hereinafter referred to as "the parent application," is directed toward providing improved wind generating apparatus, with a view to at least minimizing the deficiencies of the prior art and producing an apparatus which effectively optimizes the balance between economy of production and maximum operating efficiency. To this end, the invention disclosed in the parent application relates to various aspects pertaining to the construction of wind-generating apparatus and also to methods of manufacturing component parts thereof.

SUMMARY OF THE INVENTION

The present invention seeks to modify certain aspects of the wind generating apparatus disclosed in the parent application, in a continuing effort to improve performance and/or production economy. The teachings of the parent application are still considered relevant to the production of efficient wind generating apparatus, and the present invention at least in certain of its aspects, merely offers alternative constructions, which may be preferable in certain applications. In other of its aspects, the present invention is directed towards features of construction not specifically referred to in the parent application.

In one of its aspects, with a view to improving the weathervaning characteristics of a wind generator, particularly to obtain greater stability and smoothness of operation in light gusty winds, the invention provides a novel form of yaw damper, i.e., a damper which resists rotation of the generator head assembly about the vertical axis upon which it is mounted.

In another aspect, the invention provides a novel form of overspeed control for the blades of a wind generator, which causes the rotor to stop in an overspeed condition and allow the rotor to come back up to speed after a predetermined length of time.

A further aspect of the invention relates to a mechanism for retaining the pitch of the rotor blade substantially constant during normal operating r.p.m. but which allows the blades to pitch up when an overspeed condition occurs.

Yet another aspect of the invention relates to a novel mechanism for controlling the pitching up of a rotor blade in an overspeed condition and the subsequent pitching down of the blade when the overspeed condition is eliminated.

The invention further relates in another aspect, to a system whereby the rotor blades are caused to change pitch during coning changes so that the blade pitch is optimized in different wind conditions.

In still a further aspect, the invention provides a novel form of self-adjusting brake, particularly suitable for use as a disk-type brake for stopping the rotor of a wind generator apparatus when required.

The invention thus resides in a number of aspects which may be used separately or in different combinations in wind generating apparatus so as to collectively contribute to the overall operating efficiency of the apparatus.

Exemplary embodiments of a wind generating apparatus in accordance with the invention will be described with reference to the accompanying drawings, and it is to be understood that features of such apparatus may not be described herein in detail where these are contained in the parent application.

DESCRIPTION OF PREFERRED EMBODIMENT

The illustrated wind generator apparatus is of the same overall design and construction as that disclosed in the parent application, the entire disclosure of which is incorporated herein by reference, and accordingly only modified aspects of the structure and features not specifically disclosed in the parent application will be described herein in detail. For a more detailed description of the construction and operation of the apparatus in general, reference may be made to the parent application.

Figure 1:
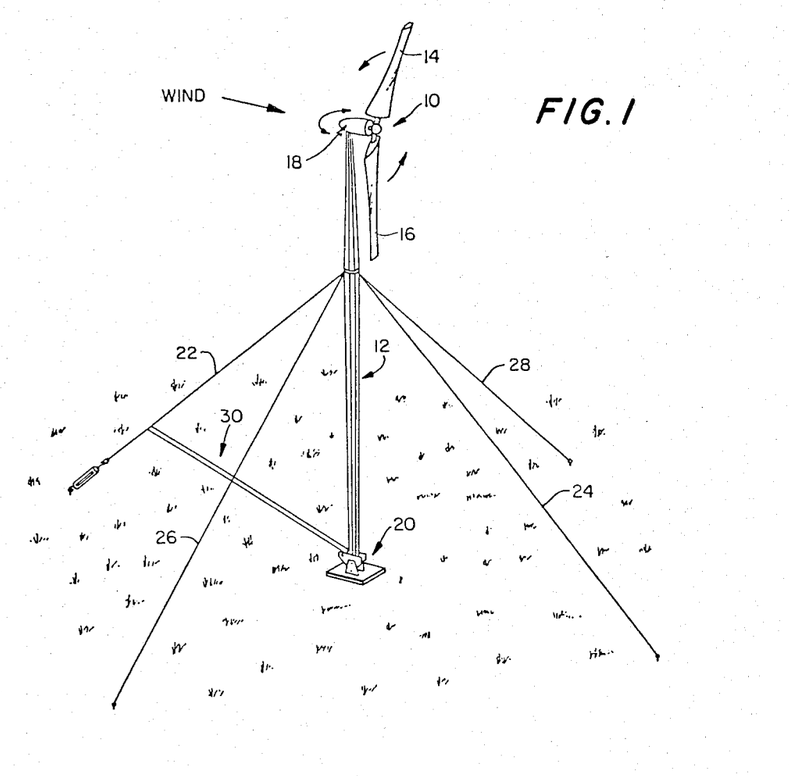
FIG. 1 is a perspective view illustrating the appearance, overall, of wind generator apparatus in accordance with the invention.

Referring now to FIG. 1, the illustrated wind-driven generator apparatus comprises a rotor 10 supported on a tower 12. In the form shown, the rotor has a pair of blades 14 and 16 and is part of a head assembly 18 mounted on top of the tower. The tower base 20 is supported on the ground and is stabilized by guy wire elements 22, 24, 26, and 28. A gin pole 30 is employed in raising and lowering the tower as fully discussed in the parent application.

Figure 2:
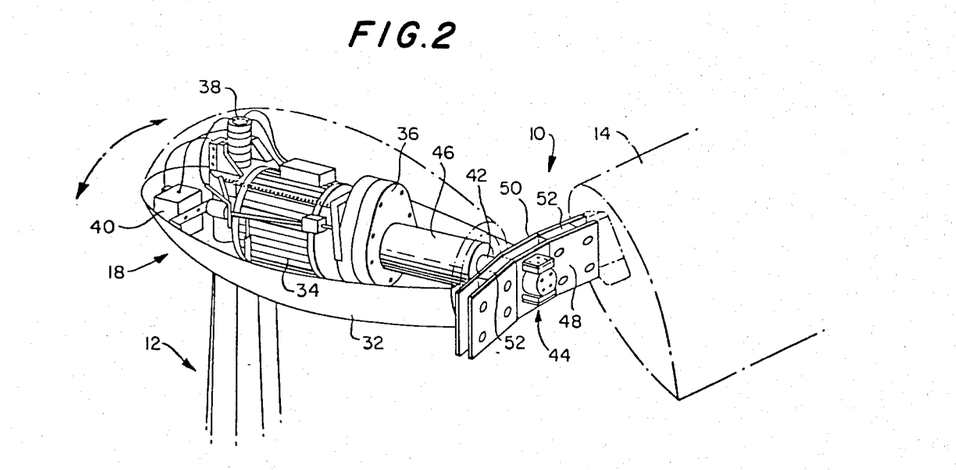
FIG. 2 is a perspective view of a portion of the apparatus forming the head assembly of the wind generator.

As shown in FIG. 2, the head assembly 18 comprises a streamlined housing or pod 32 which may be formed of fiberglass, for example, and which may include upper and lower sections that are bolted together, the upper section being shown in phantom line. Located in the housing is an AC generator 34 driven by rotor 10 via a gear box 36. Head assembly 18 is supported on the tower for yawing movement about the longitudinal axis of the tower, and a slip ring unit 38 and associated brushes permit electrical connections to generator 34 and other electrical apparatus designated generally by reference numeral 40 without concern for yawing movement of the head assembly.

AC generator 34 is preferably an induction generator, that is, an induction motor that is driven above synchronous speed, when the slip becomes negative. The induction generator cannot generate its own exciting current; the exciting current is supplied by AC power lines. The frequency and voltage of the induction generator are those of the AC lines to which it is connected for excitation. Details of the generator and its electrical control are described in full in the parent application.

Rotor 10 is supported on a rotatable shaft 42 by means of a teetering hub 44 as fully described in the parent application and which allows limited rocking movement of the rotor on the shaft. Shaft 42 is supported by conventional bearings (not shown) in a tubular housing extension 46 of the gear box 36. The hub may include a pair of parallel metal plates 48 and 50 spaced apart by spacers 52 which may be welded to the plates. The plates are angled as shown to provide for pre-coning of the rotor blades at a small angle which may, for example, be in the range of 2-5 degrees and is preferably about 3 degrees. Blades 14 and 16 are attached to the hub through a central spar of each blade substantially in the manner disclosed in the parent application, the root block of each spar being embraced between plates 48 and 50.

Figure 3:
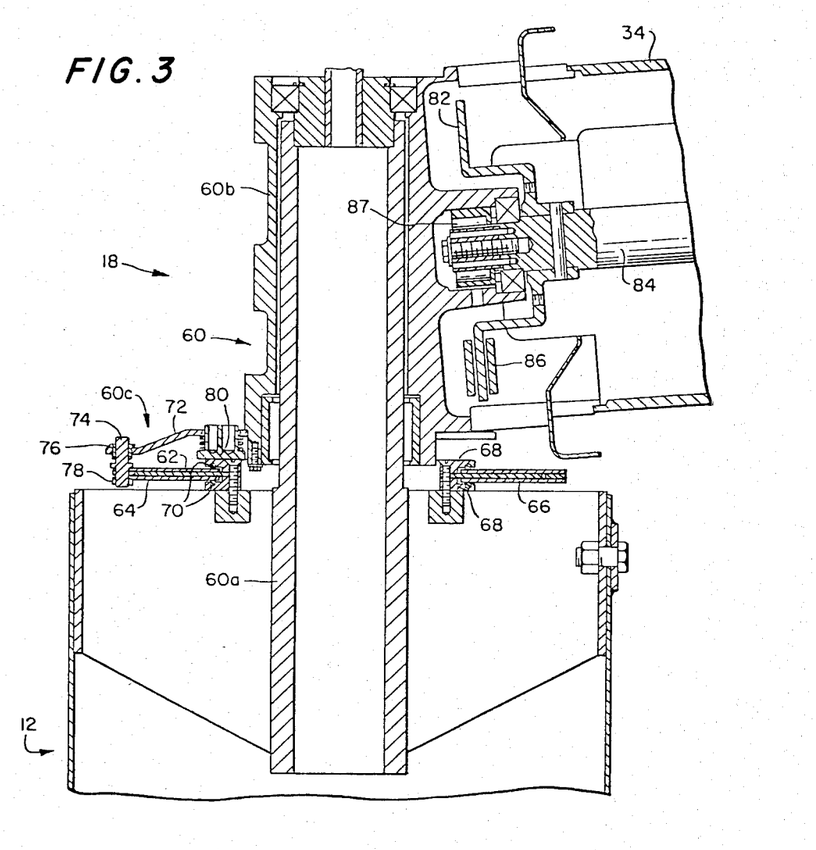
FIG. 3 is a vertical sectional view illustrating a yaw bearing and yaw damper at the top of a tower.
Figure 4:
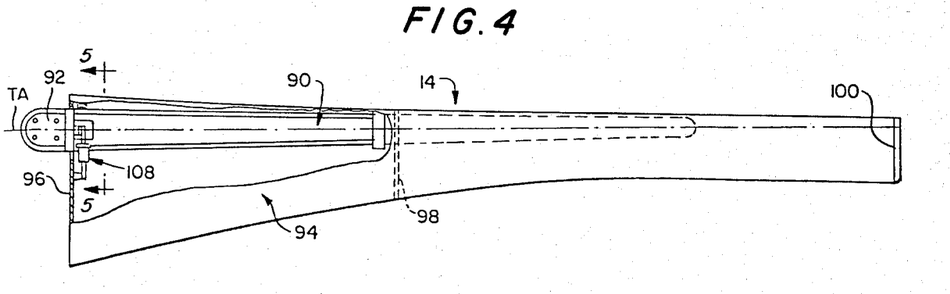
FIG. 4 is a plan view illustrating a wind-driven rotor blade in accordance with the invention, part of the blade being broken away and shown in section.

As shown in FIG. 3, generator 34 is supported cantilever-fashion on a yaw-bearing structure 60 including, inter alia, an inner bearing tube 60a projecting from the top of tower 12 and an outer bearing tube 60b fixed to generator 34. A yaw damper assembly 60c is provided for damping rotational yawing movement of the generator about the vertical axis of the tower, for example, during weather-vaning of the head assembly 18. Damper 60c may, for example, comprise upper and lower disks 62 and 64, respectively, which are caused to rotate with outer bearing tube 60b relative to a central disk 66 embraced between upper and lower disks 62 and 64. Disks 62 and 64 define an annular chamber which in use is filled with thick silicone oil of, for example, 60,000 centistokes viscosity. Damping is achieved by a shearing action imposed on the oil through rotation of disks 62 and 64 relative to disk 66. Annular brackets 68 connected to the tower structure, as by screws, as shown, clamp the inner periphery of disk 66 therebetween and have annular seals 70 to seal the oil within the annular chamber. Seals 70 slide on Teflon (T.M.) tapes bonded to the outer surfaces of disks 62 and 64. Disks 62 and 64 are connected to outer tube 60b so as to rotate therewith, by a diametrically extending arm 72 (only one half of which is shown in the drawing) attached to outer tube 60b and by pins 74 slideably mounted in bushes 76 carried by the arm and in bearings 78 formed in the disks 62 and 64. An oil reservoir, (not shown), having a gravity feed may be attached to the top disk 62 to replenish any oil which may leak out from the annular space. A brass lightning brush 80, carried by arm 72 is spring urged into engagement with the upper surface of top most bracket 68.

Also shown in FIG. 3 is a flange 82 mounted at the rear end of shaft 84 of the AC generator. Flange 82 serves as a disk for a self-adjusting disk brake arrangement shown diagrammatically at 86, and the construction of which will be described in detail hereinafter. Shaft 84 is also provided with a one-way clutch arrangement 87 which prevents the rotor from turning in the wrong direction once it has stopped.

The yaw damping arrangement shown in FIG. 3 is intended to reduce friction compared with the equivalent arrangement disclosed in the parent application and also reduce yaw dampening deterioration due to leakage. Further, the yaw damping arrangement makes the weathervaning rotation of the head assembly more smooth and helps keep the wind generator down wind in light winds.

Reverting now to a discussion of blades 14 and 16, the construction of these blades, apart from modifications in a pitch control mechanism, is substantially identical to the blade construction disclosed in the parent application. Accordingly, such construction will not be described herein except as necessary to explain the modified pitch control mechanism. Full details of the construction of the blade and its method of manufacture may be obtained by reference to the parent application.

Blades 14 and 16 are identical and only blade 14 is, therefore, illustrated in FIGS. 4-10. As in the parent application, the blade consists of a torsionally soft spar 90, an airfoil 94 and ribs including a root rib 96, a median rib 98 and an outboard rib 100. Airfoil 94 has a hollow inboard portion, for example, extending between ribs 96 and 98 and a solid outboard portion. The inboard portion has an initial degree of twist and the outboard portion is substantially flat. Further, the outboard portion of the airfoil is attached to spar 90, while the respective inboard portions of the spar and airfoil are free to twist relatively during changes of pitch. Airfoil 94 is secured to root rib 96. The construction of the blades is such that during changes of pitch, the entire blade twists about a longitudinal twist axis TA and further the inboard portions of the spar and the airfoil (along with root rib 96) twist relative to one another.

In accordance with the invention, and as explained fully in the parent application, a pitch control mechanism is provided for each blade which has the effect of maintaining substantially constant pitch during the normal operating r.p.m. of the generator despite the tendency of increased centrifugal force acting on the blade to pitch the blade up, the mechanism allowing the blades to pitch up, however, in overspeed conditions. The pitch control arrangement disclosed in the parent application utilized a torsion bar associated with the blade spar to maintain constant pitch during normal generator r.p.m. The pitch control mechanism hereinafter described with particular reference to FIGS. 4-10 is a modification of the torsion bar system disclosed in the parent application.

Figures 5, 6, 7, 9:
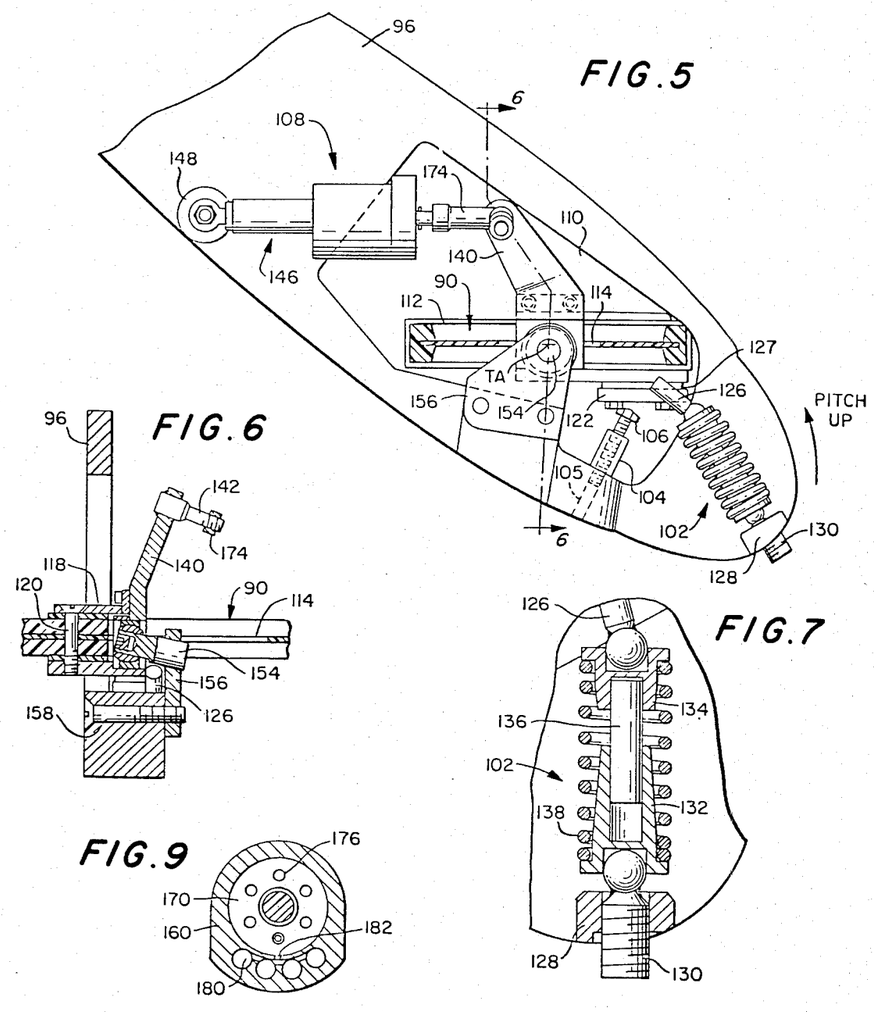
FIG. 5 is a cross sectional view through the blade taken substantially on line 5—5 of FIG. 4 and with an airfoil section of the blade being removed for clarity.
FIG. 6 is a longitudinal sectional view on line 6—6 of FIG. 5.
FIG. 7 is a cross-sectional view of a spring toggle.
FIG. 9 is a cross-sectional view on line 9—9 of FIG. 8.
Figures 10, 11:
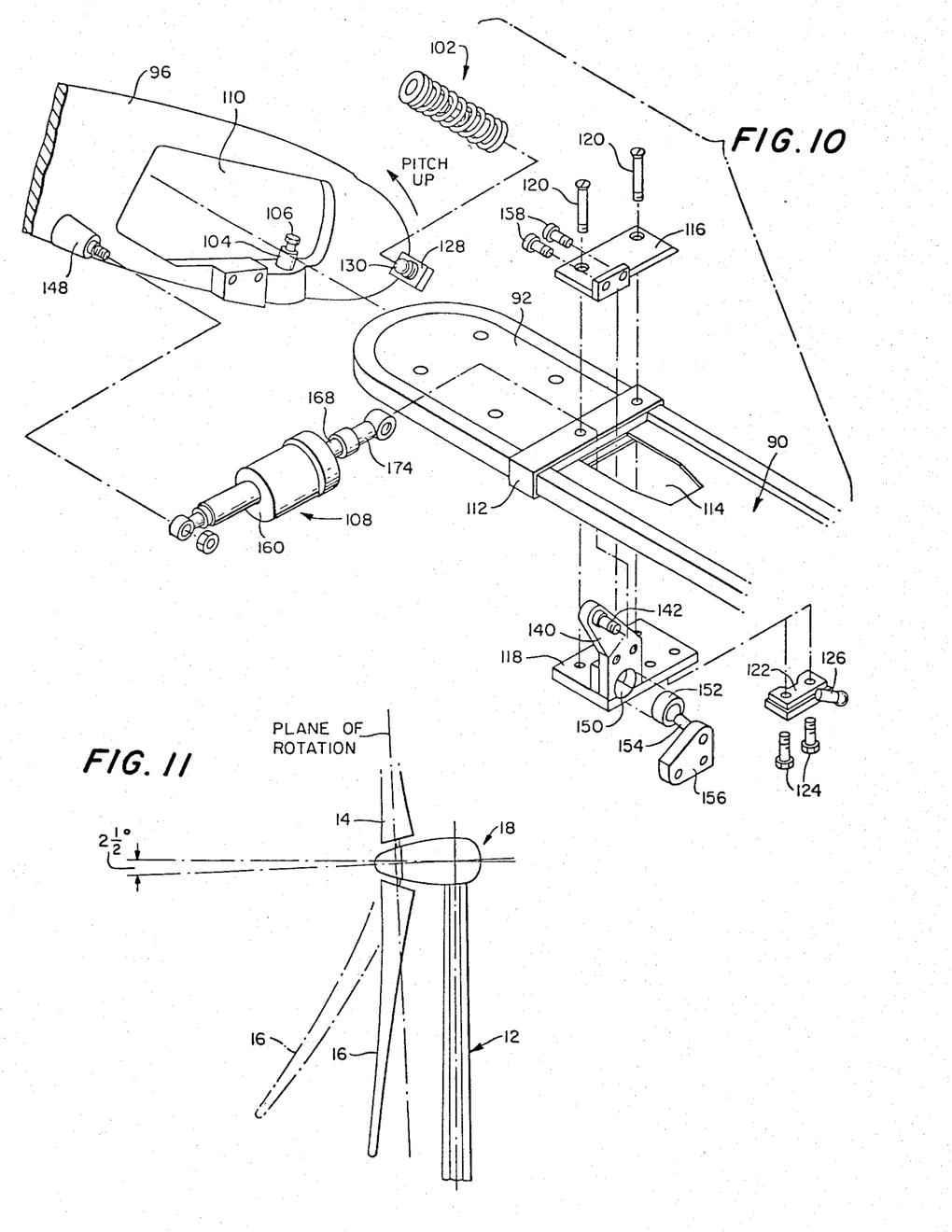
FIG. 10 is an exploded perspective view illustrating parts of the blade shown in FIGS. 5–9.
FIG. 11 is a diagrammatic view illustrating the manner in which the rotor blades may bend or cone in use.

Referring now in particular to FIGS. 5, 6, and 10, upon rotation of the blade about the rotor axis, increase in centrifugal force has the tendency to cause the blade to pitch up by twisting of root rib 96 relative to spar 90 in the direction of the arrows shown in FIGS. 5 and 10. In accordance with the present invention, this tendency of the blade to pitch up is resisted by the pitch control mechanism at normal operating r.p.m., whereby the blade rotates at substantially constant pitch during the normal operating range of the generator. In an overspeed condition, however, the pitch control mechanism allows the blade to pitch up into a stalling condition and then, once the rotor stops, the pitch control mechanism allows the blade to return slowly to its normal operating pitch. Details of the pitch control mechanism will now be described.

Basically, the pitch control mechanism comprises a spring toggle assembly 102 connected between root rib 96 and spar 90 for resisting pitching up movements of the blade during normal operating r.p.m., this assembly, however, allowing the blade to pitch up in an overspeed condition until an upper pitch stop 106 carried by the root rib engages spar 90. The pitch control mechanism further includes a piston and cylinder-type hydraulic damper assembly 108 also connected between the root rib 96 and spar 90 which effectively does not resist pitching up movements of the blade but which damps pitching down movements thereof as will be described.

As shown particularly in FIGS. 5 and 10, spar 90 extends through a cut-out 110 in root rib 96 so that root block portion 92 is located on the inboard side of the root rib and a band 112 encircling the spar is located substantially in the region of the root rib cut-out. On the outboard side of band 112, spar 90 is itself provided with a cut-out 114. Band 112 carries upper and lower mounting brackets, 116, 118 secured together through spar 90, for example, by screws 120, and bracket 118 itself carries on its undersurface a mounting block 122 attached, for example, by screws 124. Mounting block 122 has a post 126 welded or otherwise secured to its outboard edge. As shown, post 126 has a spherical end forming an attachment between spar 90 and spring toggle assembly 102. An attachment for the other end of the spring toggle assembly takes the form of a plate 128, welded or otherwise attached to the tip of root rib 96 and carrying a threaded post 130 also having a spherical end. Spring toggle assembly 102 is secured between the spherical ends of post 126 and 130 and the screw adjustment facility of post 130 allows for adjustments in the length of the spring toggle. As shown particularly in FIG. 7, assembly 102 comprises a pair of hollow frusto-conical cups 132, 134 embracing the spherical ends of the respective posts 126 and 130, a central rod 136 connected between cups 132 and 134 and an outer coil compression spring 138.

Plate 118 has an upwardly extending outwardly inclined arm 140 with a rod 142 at its outer end forming a mounting for a piston assembly 144 of hydraulic damper 108. A cylinder assembly 146 of the damper is connected to root rib 96 by a mounting bracket 148. Further, arm 140 has a circular opening 150 receiving a swivel bearing 152. The swivel bearing connects with a spherical-ended swivel rod 154 carried by a plate 156 attached to root rib 96, for example, by screws 158.

Pitch up stop 106 is in the form of a screw which threads into a bore 105 in root rib 96 and a jam nut 104 is provided for locking screw 106 in position. The position of the stop can thus be adjusted by screwing screw 106 in bore 105 to the desired position and then screwing nut 104 tightly against the face of rib 96.

The inboard face of root rib 96 may be provided with a spring cover plate (not shown) of the type referred to in the parent application, for preventing extraneous objects from entering the blade interior through opening 110.

Figure 8:
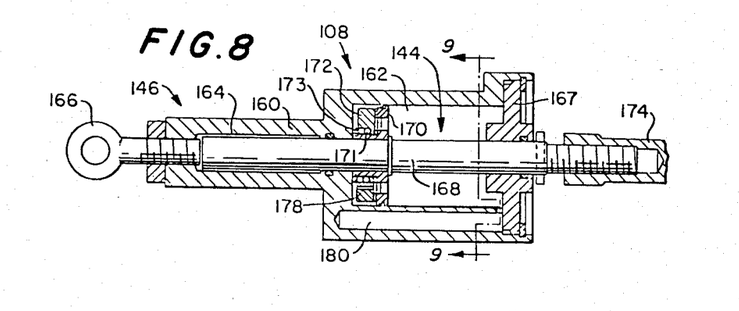
FIG. 8 is a longitudinal sectional view of a pitch damper.

The construction of hydraulic damper 108 is illustrated in FIGS. 8 and 9. Cylinder assembly 146 of the damper comprises a housing 160 defining a cylinder chamber 162 which in use is filled with high viscosity oil, for example, of 60,000 centistokes viscosity, housing 160, further defining an extension 164, the end of which is attached through a rod end bearing 166 to boss 148. Cylinder chamber 162 is closed by an end plate 167. Piston assembly 144 includes a piston rod 168, a piston 170, carried by rod 168, and a valve plate 174 spring urged into face-to-face contact with one side of piston 170 by means of a coil spring 171. Spring 171 fits in a recess in plate 172 and acts between an internal shoulder of plate 172 and a collar 173 carried at the end of a tubular extension of piston 170. Piston rod 168 has a screwed end attached to rod 142 by a rod end bearing 174 into which the end of piston rod 168 is screwed. Conventional O-ring seals are provided between piston 170 and housing 160 and also between the piston rod, housing 160 and end plate 167.

Piston 170 has a series of openings 176 and valve plate 172 has one or more constricted openings 178 aligned with openings 176. With this arrangement, when the piston is moved to the right as shown in FIG. 8, liquid in chamber 162 can flow relatively freely through the openings 176 and around valve plate 172 which moves away from engagement with piston 170 against spring 171.

Thus, movement of the piston to the right is relatively unimpeded. When the piston is moved to the left, however, liquid must flow through the restricted opening 178 in valve plate 172 thereby impeding movement of the piston in this direction. Opening 178 may, for example, be 0.025 inches internal diameter and 0.3 inches long, and these dimensions combined with the above-mentioned high viscosity liquid may impose a time period of about 30 minutes on right to left-hand strokes of the piston. It will be appreciated that during pitch up movements of the blade, the damper assembly is extending, i.e., the piston moves to the right as shown in FIG. 9, and this motion is relatively unimpeded. During pitching down movements of the blade, the damper assembly retracts with the piston moving to the left, and this motion is thereby impeded by orifice 178. Further, with the configuration of the pitch control mechanism, and the above described linkage of the hydraulic damper between root rib 96 and spar 90, the damper itself forms a pitch down stop for the blade when the damper reaches its maximum retracted position, i.e., when the piston "bottoms out" as illustrated in FIG. 8. Moreover, the facility for adjusting the effective length of piston rod 168 by means of its screwed end received in rod end bearing 174, provides adjustment for normal operating pitch configuration of the blade whereby the operating pitch of the respective generator blades may be balanced.

To compensate for any oil losses from chamber 162, housing 160 may be provided with a series of intercommunicating oil reservoir bores 180 connected with chamber 162 via a central duct 182. In actual use of the damper, bores 180 may be positioned relative to chamber 162 so as to top it up by the action of centrifugal force acting on the oil in bores 180 as described in the parent application.

From the foregoing, it will be apparent that when the generator apparatus is operating at normal r.p.m., the pitch of the blades is maintained substantially constant due to the force of toggle spring assembly 102 acting to hold the blade against the pitched-down stop constituted by the hydraulic damper assembly 108 as described above. When the generator accelerates, however, into an overspeed condition above a predetermined r.p.m., the centrifugal force tending to pitch the blades up is sufficient to overcome the force of the spring toggle assembly, and accordingly, the blade commences to pitch up. This movement effectively alters the condition of the spring toggle assembly until the assembly toggles over-center and then assists in pitching the blade up, thus reducing the pitching moment required to pitch the blade up. (If required, a weight may be attached to the trailing edge of the root rib to increase the pitching-up moment.) The result is that once the blades start to come off the pitched down stop, in an overspeed condition, they pitch all the way up to pitch stop 106 with very little increase in r.p.m. In the pitched up condition, stop 106 engages spar 90. It will be appreciated that the force of spring 138 of the toggle linkage is suitably chosen to provide sufficient resistance to pitching up of blades only up to a predetermined r.p.m.

The blades pitch up into a stalling condition, and once the rotor stops turning and there is no centrifugal force causing the blades to pitch up, the twist moment developed between the spar 90 on the one hand and root rib 96 and the blade airfoil on the other hand, acts to return the blade to the pitched down condition against the force of spring toggle linkage 102 and against the action of damper assembly 108. As indicated, the restriction in the damper assembly may be such as to delay return of the blades from the pitched up to the pitched down configuration up to approximately 30 minutes.

Figure 14:
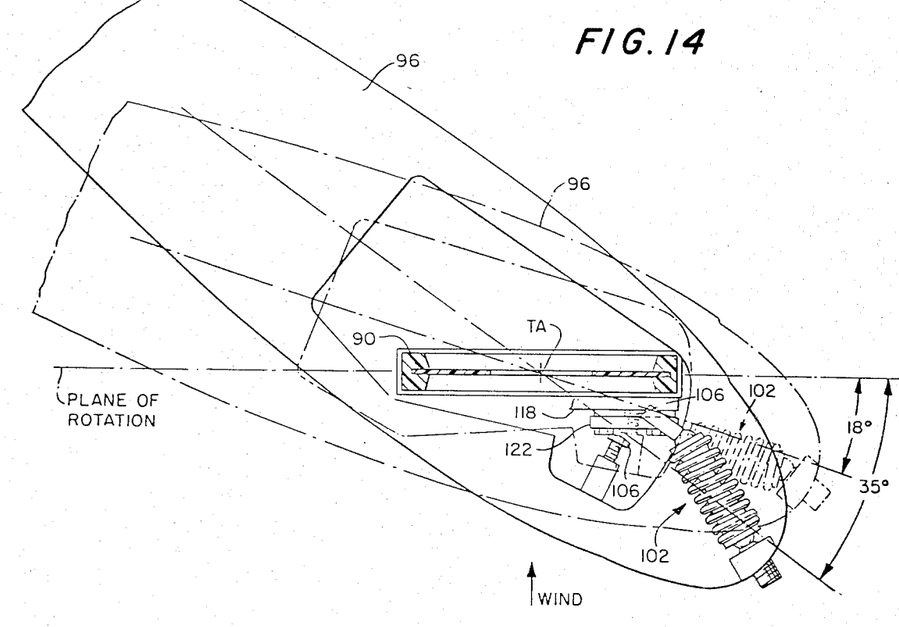
FIGS. 14 and 15 are diagrammatic views on the inboard and outboard ends of a blade showing how the blade changes pitch.
Figure 15:
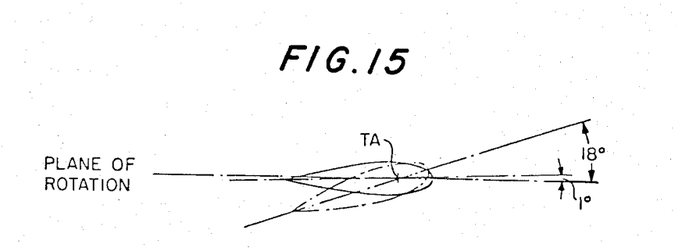

Operation of the pitch control mechanism is illustrated diagrammatically in FIGS. 14 and 15. At least in the preferred arrangement, the configuration of each blade and pitch control mechanism is such that during normal operating speed the root rib 96 is held by the spring toggle assembly in a position (shown in solid line in FIG. 14) in which it is pitched down by about 35° with respect to the plane of rotation of the rotor. In this condition, the inherent twist in the blade previously referred to is such that the outboard end of the blade is pitched up by about 1° with respect to the plane of rotation (as shown in solid line in FIG. 15).

When the blade goes into an overspeed condition, in which centrifugal force overcomes the force of the spring toggle, the blade pitches up, until at the inboard end, when pitch stop 106 is encountered, the root rib may, for example, be pitched down by only about 18° (shown dotted in FIG. 14) while the outboard end of the blade is pitched up by about 18° (FIG. 15). Shims 127 (FIG. 5) may be provided for accurately setting the angle at which the spring toggle moves overcenter to assist in the pitching-up movement of the blade.

It will be understood that the above-quoted angles are only exemplary and may be varied on either side of the plane of rotation.

The pitch control mechanism as described above, has the additional effect that as the blade cones due to changing wind velocities (as shown diagrammatically in FIG. 11), the blade pitch will also change, resulting in an optimum pitch for either low or high winds. This is due to the fact that as the blade cones, the angle between root rib 96 and spar 90 changes. Arm 140 being attached to the spar moves away from the root rib as coning increases. So long as the spring toggle assembly 102 holds the damper assembly 108 in its fully retracted condition, when arm 140 moves away from root rib 96 during coning changes by swiveling on the spherical end of rod 154 (see particularly FIG. 6), the end of arm 140 attached to rod end bearing 174 moves fore and aft, resulting in a change of pitch. In accordance with the invention, the blade hub 44 (see FIG. 2) has a built-in precone of approximately 3 degrees. The correct blade angle of attack for a 25 mph wind is set when the spar is prebent to a cone of 12 degrees (the approximate blade cone at 25 mph). Therefore, at a cone of 3 degrees (approximately $7\frac{1}{2}$ mph) the blade is pitched down approximately $2\frac{1}{2}$ degrees from the blade angle of attack at 25 mph. With the present arrangement, therefore, the coning angle will be 3 degrees from zero to $7\frac{1}{2}$ mph and then increased, reaching 12 degrees at 25 mph, with a maximum cone of 14 degrees at approximately 30–40 mph. By arranging the damper assembly 108 in the above-described manner and using this as a pitch stop for controlling the blade pitch during normal operating r.p.m., the correct angle of attack (to a tolerance of within about $\frac{1}{8}°$) is achieved at wind speeds between 10 and 25 mph.

Figures 12, 13:
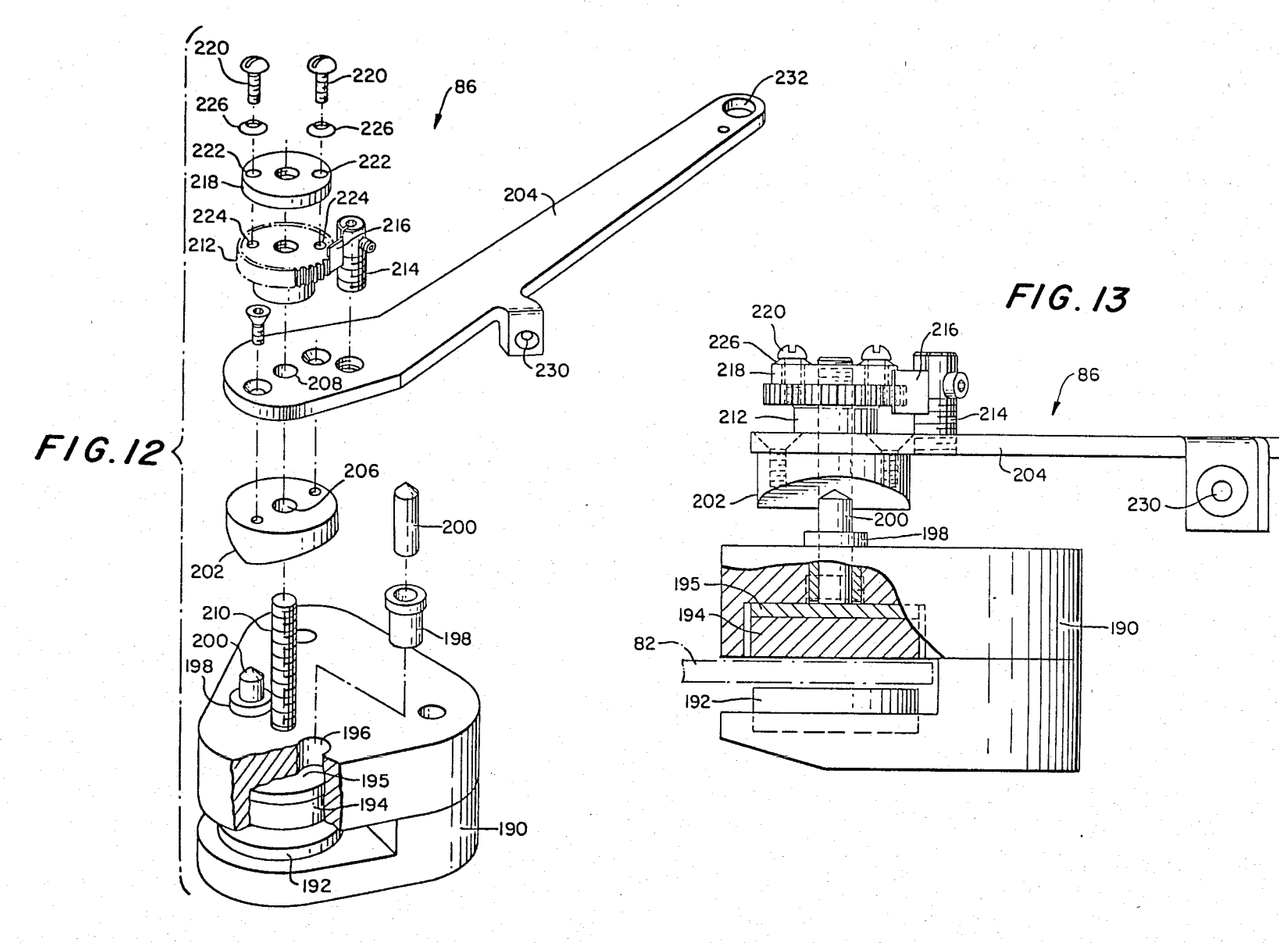
FIG. 12 is an exploded perspective view of a self-adjusting brake.
FIG. 13 is a longitudinal sectional view of the brake shown in FIG. 12.

In accordance with a further preferred aspect of the invention, there is provided, as previously indicated with reference to FIG. 3, a self-adjusting brake mechanism acting on the brake disk 82 attached to generator shaft 84. This brake mechanism is shown diagrammatically at 86 in FIG. 3 and is further shown in detail in FIGS. 12 and 13, brake disk 82 being shown in phantom in FIG. 13. Referring particularly to FIGS. 12 and 13, brake mechanism 86 includes a brake block 190 having a fixed puck 192 and a moving puck 194 which, in use, embrace disk 82, with block 190 being mounted in any suitable manner in head assembly 18. Block 190 is provided with bores 196 accommodating sleeves 198 and internal floating pins 200 which fit in the sleeves and rest on the upper surface of puck 194 through a steel washer 195. To apply the brake, pressure is applied to the tapered upper ends of pins 200 by means of a cam disk 202. Cam disk 202 is screwed to an operating lever 204, and the disk and lever have aligning plain central bores 206, 208 by which the lever and cam disk are carried on a screw shaft 210 projecting from block 190. Screwed onto shaft 210 above lever 204 is a ratchet gear 212, and lever 204 carries a post 214 with a spring 216 engaging the external teeth of ratchet gear 212. A friction disk 218 is screwed onto shaft 210 above the upper surface of gear 212 and screws 220 pass through plain openings 222 in disk 218 and are screwed into aligned bores 224 in ratchet gear 212. Belville washers 226 are interposed between the heads of screws 220 and disk 218.

To apply the brake, lever 204 is pivoted about shaft 210 in the counterclockwise direction causing cam disk 202 to press against pins 200 and apply pressure to puck 194, with the cam disk reacting against ratchet 212 which thus constitutes a reaction member. During this brake applying movement, gear 212 is prevented from rotating counterclockwise by the friction disk 218. If the play in the brake is insufficient, during a brake applying movement of lever 204, to cause spring 216 to move over a gear tooth of gear 212, then, when the brake is released, no movement will be imparted to the ratchet gear. On the other hand, if during a brake application, there is sufficient play in the brake to cause spring 216 to move over one of the gear teeth, then, when the brake is returned to the off position, by clockwise movement of lever 204 about shaft 210, such movement will be accompanied by slight clockwise rotation of gear 212 on shaft 210 through the ratchet action of spring 216 in engaging a further tooth or teeth. Thus, the brake is self-adjusting and automatically accommodates wear taking place between the pucks and brake disk 80 so that arm 204 will always move through the same distance in applying the brake irrespective of any brake wear.

As in the parent application, the brake may be applied manually by a cable attached to lever 204 via opening 230 or opening 232 and extending down the generator tower or alternatively or additionally an automatic system may be provided for operating the brake in response to an abnormal imbalance occurring in the generator head assembly.

In accordance with a further feature of the invention, it is preferred to pitch the rotor axis of the generator apparatus down from the horizontal as shown diagrammatically in FIG. 11. Further, it has been found that for optimum results in tracking the wind, the axis should be pitched down at an angle up to about 5° and preferably at an angle of about $2\frac{1}{2}°$. Pitching the generator axis either up from the horizontal (as shown for example in FIG. 3) or down from the horizontal leads to improved wind tracking compared with a horizontal axis, insofar as in either case the generator will tend to track downwind better than a horizontal axis from an upwind condition in relatively light winds. The downwardly pitched axis, however, is found to provide more accurate tracking in the downwind condition than the upwardly pitched axis by as much as 35 degrees in winds of 7–10 mph. The reason for this characteristic is a state of uneven loading on the blades due to wind shear. (Wind velocity is higher in the upper rotor quadrant than the lower.) This increase in wind velocity in the upper quadrant over the lower causes the upper blade to produce more lift. Because of this unbalanced load on the blades, the upper blade will pull away from the plane of rotation perpendicular to the rotor axis. The maximum deflection occurs 90° after the point of greatest lift, so in this case it would occur when the blades are horizontal. Since the lift on the rotor is perpendicular to the plane of rotation and since the plane of rotation is no longer perpendicular to the shaft axis, the wind generator is pulled around out of the wind until the lift of the bottom blade which is now slightly advancing into the wind equals the lift on the upper blade.

To correct this problem the rotor axis is tilted down slightly. This causes the bottom blade to be more nearly perpendicular to the wind direction than the upper blade because the rotor operates with a cone. The bottom blade, because it is more nearly perpendicular to the wind direction is sweeping a greater area and thus has the potential to produce more lift. From experiment, it was found for our generator operating at a hub height of 60 feet that a rotor axis tilt down of $2\frac{1}{2}°$ causes the lower blade to have the same lift as the upper blade in light winds and thus track the wind more accurately than a rotor axis which is horizontal or pitched up. The pitch up rotor axis is the worst case for tracking in light winds, although any configuration of rotor tilt axis tracks well in winds greater than 20 mph.

The optimum rotor pitched down axis may vary between different styles of wind generators and with different rotor hub heights and ground terrain.

While only preferred embodiments of the invention have been described herein in detail, it will be understood that the invention is not limited thereby and modifications can be made within the scope of the attached claims.

We claim:

1. In wind-driven generator apparatus including rotor blade means, a rotor shaft, hub means supporting said blade means on said rotor shaft and electric generator means having a shaft which is to be rotated in a desired direction for effecting the generation of electricity and which is fixedly coupled to said rotor shaft for being driven in rotation by said rotor shaft, the improvement comprising, in combination, blade pitch control means and clutch means, said blade pitch control means including means for maintaining said blade means in a given pitch configuration during normal operating conditions and for permitting said blade means to pitch to a stall configuration to prevent substantial overspeeding of said rotor shaft and damper means for delaying the return of said blade means from said stall configuration to said given configuration, said clutch means being cooperable with said rotor shaft for permitting that shaft to rotate only in a direction corresponding to said desired direction of rotation.

* * * * *